United States Patent [19]
Knobloch

[11] Patent Number: 5,478,112
[45] Date of Patent: Dec. 26, 1995

[54] GAS GENERATOR WITH HOLDING MEANS FOR LAMINATE FILTER ELEMENTS

[75] Inventor: Hermann Knobloch, München, Germany

[73] Assignee: TEMIC Bavern-Chemie Airbag GmbH, Aschau/Inn, Germany

[21] Appl. No.: 285,011

[22] Filed: Aug. 2, 1994

[30] Foreign Application Priority Data

Aug. 13, 1993 [DE] Germany .................... 9312093 U

[51] Int. Cl.⁶ ........................................ B60R 21/26
[52] U.S. Cl. .................... 280/741; 55/497; 55/509; 102/531
[58] Field of Search .................... 280/741, 740, 280/736, 742; 55/490, 497, 509, 511; 422/167, 166, 165, 164; 102/531, 530

[56] References Cited

U.S. PATENT DOCUMENTS

| Re. 30,327 | 7/1980 | Damon | 280/740 |
| 3,203,157 | 8/1965 | Watlington | 55/495 |
| 3,527,472 | 9/1970 | Chute et al. | 280/740 |
| 3,880,447 | 4/1975 | Thorn et al. | 280/740 |
| 3,898,048 | 8/1975 | Barber et al. | 422/167 |
| 4,950,458 | 8/1990 | Cunningham | 280/741 |
| 5,259,643 | 11/1993 | Kraft et al. | 280/741 |

FOREIGN PATENT DOCUMENTS

| 0373288 | 5/1990 | European Pat. Off. | 280/736 |
| 0547842 | 6/1993 | European Pat. Off. | 280/736 |

*Primary Examiner*—Margaret A. Focarino
*Assistant Examiner*—Peter C. English
*Attorney, Agent, or Firm*—Spencer, Frank & Schneider

[57] ABSTRACT

A gas generator includes a tubular combustion chamber, and at least one filter and retaining element arranged within the combustion chamber. The filter and retaining element is inherently elastic. A holding device is formed in one piece within the combustion chamber for holding and locating the filter and retaining element in a predetermined position. The holding device extends longitudinally and parallel to an axis of the combustion chamber. The filter and retaining element is clipped into the holding device and is retained in the predetermined location by the elasticity of the filter and retaining element.

5 Claims, 2 Drawing Sheets

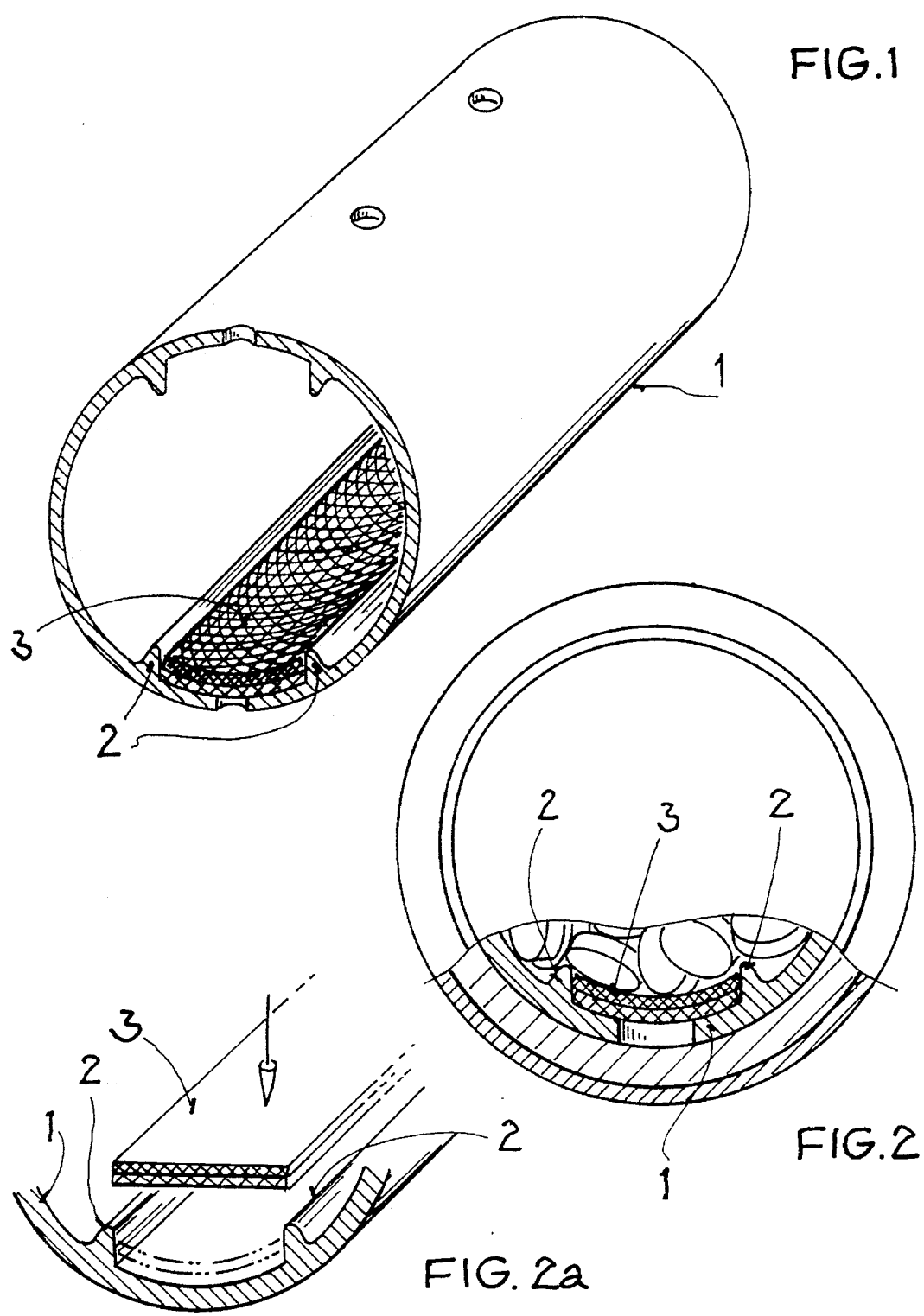

GAS GENERATOR WITH HOLDING MEANS FOR LAMINATE FILTER ELEMENTS

BACKGROUND OF THE INVENTION

The invention relates to gas generators, in particular for triggering passive passenger restraint systems in motor vehicles, with tubular or cylindrical housings in which filter or retaining elements are arranged. Such filter or retaining elements can be, for example, wire fabrics of any weave, metal-fiber felts, metal sheets etc.

By lining the tubular combustion chambers of gas generators with wire fabrics, metal-fiber felts, etc., for the purpose of filtering and retaining pyrotechnical particles from the propellant gas, it is necessary to provide either a lining in contact with the entire inner surface or, if the lining covers only part of the inner surface, an additional fixing arrangement.

A disadvantage of lining the entire inner surface is the technically unnecessary amount of material which leads to higher cost, additional weight (which is undesirable in motor vehicles) and an additional assembly operation.

Attachment by welding or fusing in the case of a partial lining requires materials that can be welded or fused together and special-purpose welding or fusing machines for production-line manufacture. This also incurs additional cost and furthermore it is difficult to keep a check on the welding or fusing quality.

SUMMARY OF THE INVENTION

The object of the invention is to specify a gas generator of the type named at the outset whose filter and retaining elements are attached by simple means without the disadvantages described above.

According to the invention there is provided on the inner surface of a tubular body that forms the gas generator a holding means formed as a single piece arranged longitudinally, in particular parallel to the axis of the tubular body, and, in order to accommodate clippable laminate elements on the surface, having sufficient inherent springiness or elasticity for affixing a clip. An important advantage of holding filter and retaining elements on the surface by the means in accordance with the invention is that no additional parts are required. The principle of this type of holding can essentially be applied to all flat, curved or sectioned laminate filter and retaining elements and which are inherently so stable that the narrow sides of these elements can absorb or exert at least small forces for a short time or permanently.

In a preferred further development of the invention, at least two ribs are provided as holding means on the inner surface of the tubular body and arranged in parallel. The filter and retaining elements can be clipped in between these ribs. The filter and retaining elements to be attached can thus be permanently fixed in all directions by a simple clip-in operation. This simple assembly step is also especially well suited to automated production-line manufacture.

These simple means of holding the filter and retaining elements in accordance with the invention also allow weight savings, as demanded by the automotive industry in particular, in order to reduce the forces that arise with dynamic loads.

Another advantage is given by the ribs which can be made to any length in tubular bodies, for instance as an extruded section.

In a preferred embodiment, a pair of ribs can be arranged opposite to each other on the inner surface of the tubular body.

BRIEF DESCRIPTION OF THE DRAWINGS

The invention will now be described and explained on the basis of examples of embodiment in conjunction with the drawings. These show:

FIG. 1 A tubular body with the holding means according to the invention. FIG. 2 Detailed sectional view of the tubular body located within an enveloping tube according to the example of the embodiment shown in FIG. 1.

FIG 2a Detailed sectional view of the embodiment shown in FIG. 1; and

DESCRIPTION OF THE PREFERRED EMBODIMENTS

Figure 3:
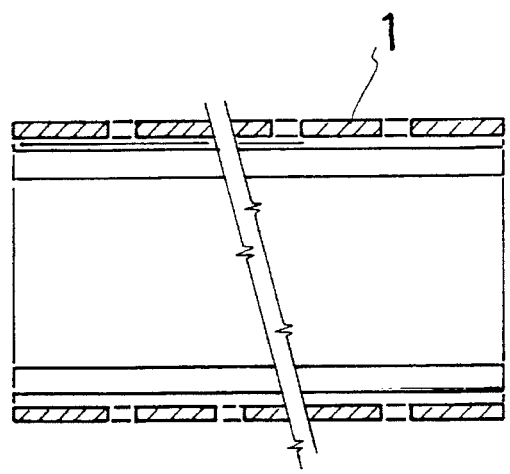
FIGS. 3 to 5a Further examples of an embodiment of the invention in longitudinal and front views.

FIG. 1 shows the principle of the holding means in accordance with the invention, where on the inner surface of a tubular body 1 adjacent ribs forming a holder 2 are arranged at a small distance from one another on diametrically opposite sides and formed in a single piece on the inner surface of the body 1. A laminate filter and retaining, element 3 is clipped in the groove between ribs 2. The filter and retaining element extends along a length of the tubular body 1 to at least partially cover an interior wall of the tubular body.

From FIGS. 2 and 2a it can be seen that one or several laminate filter and retaining elements 3 are introduced longitudinally into the tubular combustion chamber formed by body 1, in particular parallel to the axis of body 1, and then clipped radially into the holder 2. The clipped-in filter and retaining elements 3 are thus prestressed and located. When static or dynamic forces act towards the center of the body 2 and on the mounted filter and retaining elements, 3 an additional increase in the holding forces occurs due to the curvature of these elements.

Figure 3A:
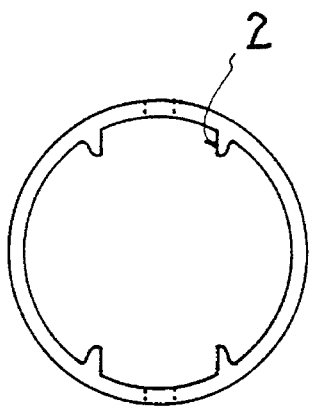

FIGS. 3 and 3a show a tubular section of a body 1 with holder 2, where this tubular body 1 had been manufactured as an extruded section and separated into partial lengths.

Figure 4:
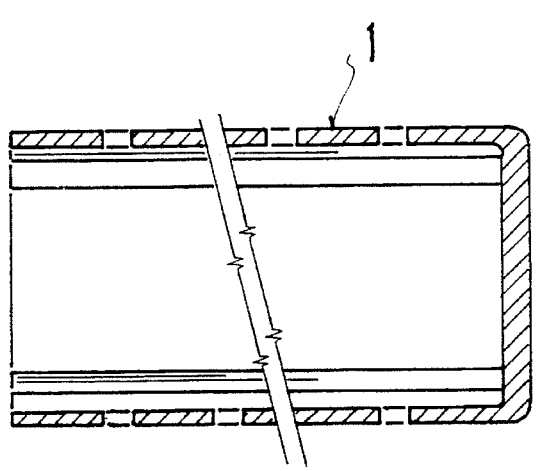
Figure 4A:
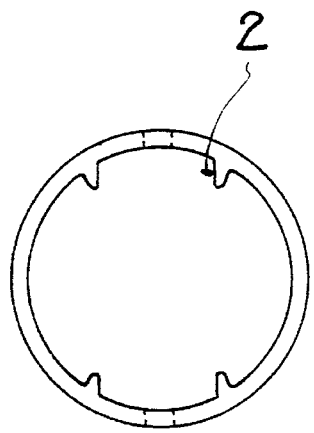

FIGS. 4 and 4a also show a tubular body 1 with a holder 2, but this has a base at one end and has been manufactured, for example, by felt pressing.

Figure 5:
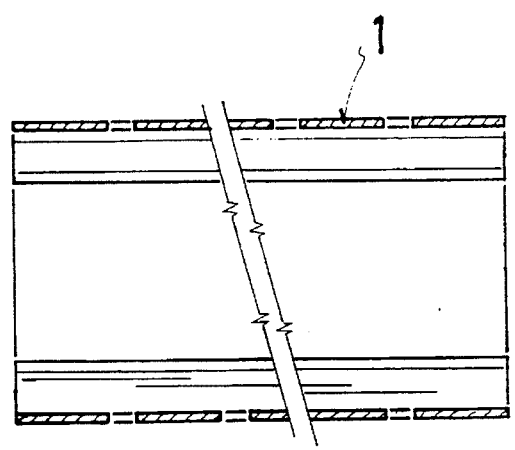
Figure 5A:
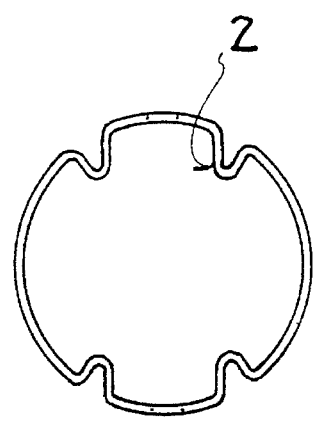

Finally, FIGS. 5 and 5a show a tubular body 1 with holder 2 manufactured from sheet-metal or thin tubes and which is particularly suitable for fitting in an enveloping tube for the escaping gases as shown in FIG. 2.

In the figures, the tubular bodies 1 with the holder 2 in accordance with the invention each represent the combustion chambers of gas generators. The necessary covers and/or bases at the ends are not, however, shown here because these, and also an enveloping tube as shown in FIG. 2, are well-known to the expert.

The holder in accordance with the invention and shown in the drawings serves to fasten filter and retaining elements in the combustion chambers of gas generators that are employed as a means of triggering passive passenger restraint systems, especially for airbags in motor vehicles. This invention is not limited solely to such applications but can also be used for such gas generators as are used for other safety or lifesaving equipment such as, for example, lifeboats, distress lifebuoys, fire extinguishers or inflatable escape chutes etc.

What is claimed is:

1. A gas generator, comprising:

a tubular combustion chamber;

at least one filter and retaining element arranged within said combustion chamber and being inherently elastic; and holding means formed in one piece with said combustion chamber and within said combustion chamber for holding and locating said at least one filter and retaining element in a predetermined position, and extending longitudinally and parallel to an axis of said combustion chamber, said at least one filter and retaining element being clipped into said holding means and being retained in the predetermined position by the elasticity of said at least one filter and retaining element.

2. The gas generator as defined in claim 1, wherein said at least one filter and retaining element extends along a length of said tubular combustion chamber to at least partially cover an interior wall of said combustion chamber.

3. The gas generator as defined in claim 1, wherein said holding means comprises at least two ribs arranged in parallel on an inner surface of said tubular combustion chamber, said at least one filter and retaining element being clipped between said at least two ribs.

4. The gas generator as defined in claim 3, wherein said at least two ribs comprise two pairs of ribs provided on diametrically opposite sides of the inner surface.

5. The gas generator as defined in claim 1, being for triggering a passive restraint system in a motor vehicle.

* * * * *